(12) United States Patent
Xia et al.

(10) Patent No.: US 8,719,261 B2
(45) Date of Patent: May 6, 2014

(54) DYNAMIC CATALOG RANKING

(75) Inventors: Wei Xia, Sudbury, MA (US); Jack Jianxiu Hao, Lexington, MA (US); Zhiying Jin, Lexington, MA (US); Shuai Wu, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 16 days.

(21) Appl. No.: 13/309,868

(22) Filed: Dec. 2, 2011

(65) Prior Publication Data

US 2013/0144871 A1    Jun. 6, 2013

(51) Int. Cl.
*G06F 7/00* (2006.01)
*G06F 17/30* (2006.01)

(52) U.S. Cl.
USPC ............. 707/727; 725/14; 725/61; 725/95

(58) Field of Classification Search
CPC ............ G06F 17/30873; G06F 17/30817; H04H 20/38; H04H 20/426; H04H 20/93
USPC .................................................. 707/727
See application file for complete search history.

(56) References Cited

U.S. PATENT DOCUMENTS

| | | | |
|---|---|---|---|
| 7,899,120 B2* | 3/2011 | Cho et al. | 375/240.16 |
| 2004/0226042 A1* | 11/2004 | Ellis | 725/43 |
| 2006/0117354 A1* | 6/2006 | Schutte et al. | 725/78 |
| 2006/0206913 A1* | 9/2006 | Jerding et al. | 725/95 |
| 2007/0150888 A1* | 6/2007 | Shapiro | 717/174 |
| 2007/0157252 A1* | 7/2007 | Perez | 725/61 |
| 2007/0294249 A1* | 12/2007 | Feyaerts | 707/6 |
| 2009/0307205 A1* | 12/2009 | Churchill et al. | 707/5 |
| 2010/0251305 A1* | 9/2010 | Kimble et al. | 725/46 |
| 2010/0299692 A1* | 11/2010 | Rao et al. | 725/14 |
| 2011/0145870 A1* | 6/2011 | Ramaswami et al. | 725/98 |
| 2012/0011551 A1* | 1/2012 | Levy et al. | 725/82 |
| 2012/0101966 A1* | 4/2012 | van Coppenolle et al. | 706/20 |
| 2012/0230419 A1* | 9/2012 | Sole Rojals et al. | 375/240.18 |
| 2012/0278767 A1* | 11/2012 | Stibel et al. | 715/854 |
| 2012/0311046 A1* | 12/2012 | Grigoriev | 709/206 |

OTHER PUBLICATIONS

The Numbers, Top-selling DVDs of 2010, http:/www.the-numbers.com/dvd/charts/annual/2010.php.*
The Numbers, Top-selling DVDs of 2010, http:/www.the-numbers.com/dvd/charts/annual/2012.php.*

* cited by examiner

*Primary Examiner* — Binh V Ho

(57) ABSTRACT

A device receives, from a user device, a search query for video content listings in a video catalog. The device identifies, based on the search query, a set of relevant video assets from an index of the catalog content and determines dimensional values of the search query. The device determines a subset of the relevant video assets based on filtering usage metrics, for the set of relevant video assets, against the dimensional values. The device calculates a popularity value for each video asset in the subset of the relevant video assets and ranks each video asset in the subset of the relevant video assets to form a ranked list. The device sends, to the user device, a response to the search query that includes the ranked list.

18 Claims, 9 Drawing Sheets

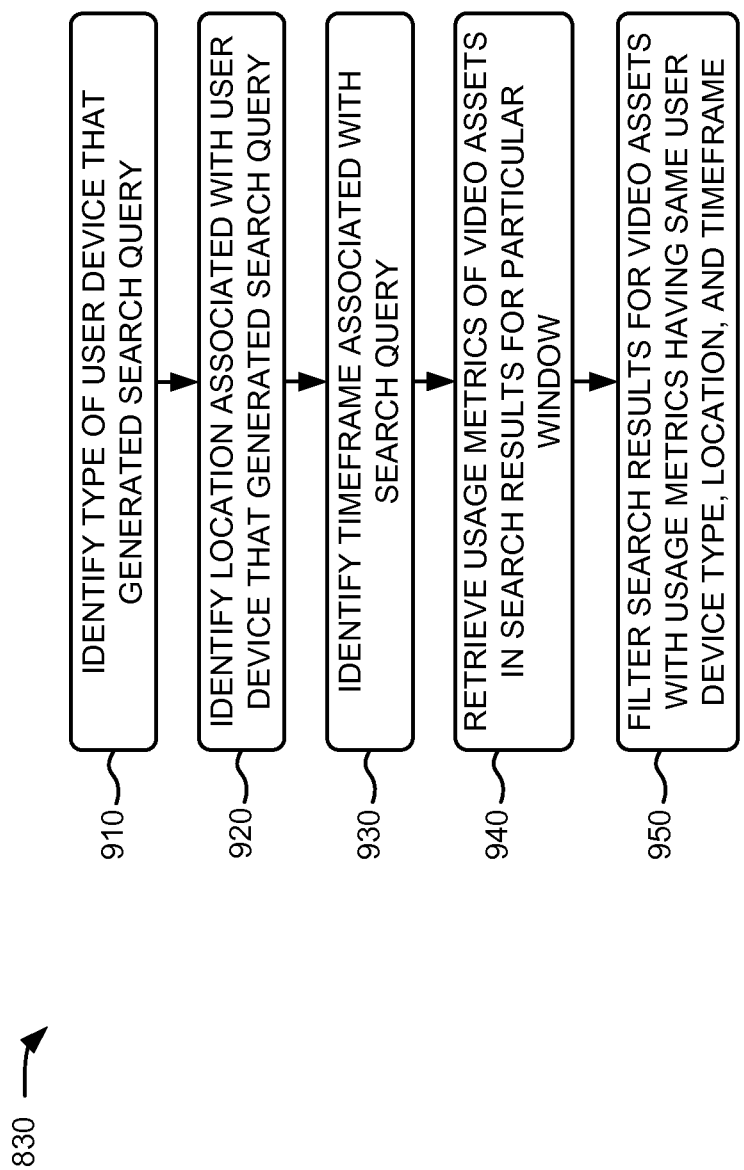

DYNAMIC CATALOG RANKING

BACKGROUND

Network providers offer video-on-demand products that allow customers to download video content (e.g., streaming video, video files, etc.) over a distributed network. In a multi-screen environment, the video content can be accessed from different devices connected to the distributed network. Access to the video content is typically present to the customer via a catalog of available items.

BRIEF DESCRIPTION OF THE DRAWINGS

FIGS. 8 and 9 are flow charts of an exemplary process for ranking video catalog assets according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a dynamic video content catalog that integrates recommendations into catalog browsing and/or searching. The systems and/or methods may receive, from a user device, a search query for video content listings in a video catalog. The systems and/or methods may identify, based on the search query, a set of relevant video assets from an index of the catalog content and may determine values for multiple dimensions (or aspects) of the search query. The systems and/or methods may determine a subset of the relevant video assets based on filtering usage metrics, for the set of relevant video assets, against the values for the multiple dimensions. The systems and/or methods may calculate a popularity value for each video asset in the subset of the relevant video assets and may rank each video asset in the subset of the relevant video assets to form a ranked list. The systems and/or methods may send, to the user device, a response to the search query that includes the ranked list followed by the remainder of the set of relevant video assets.

Figure 1:
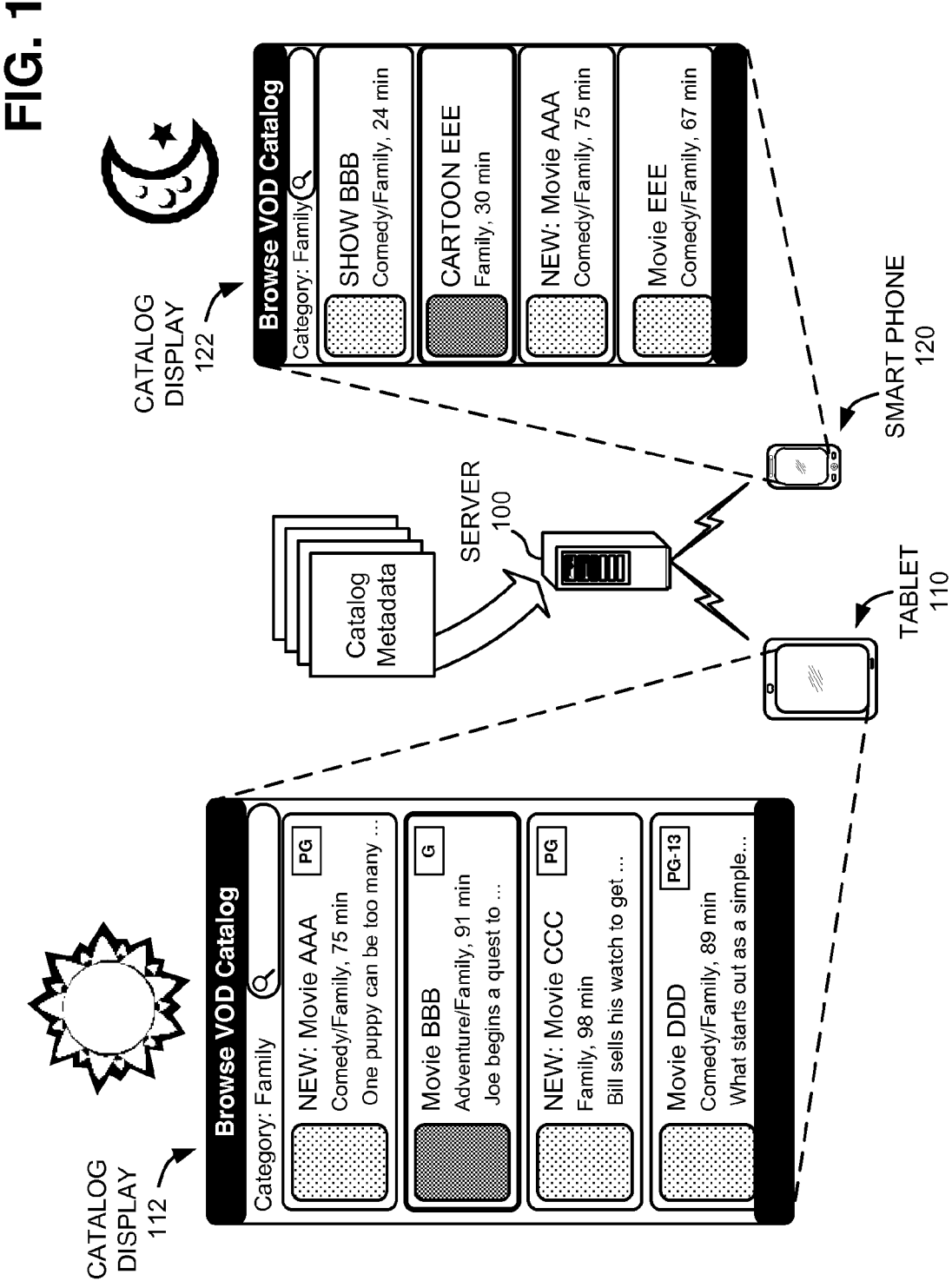
FIGS. 1 and 2 are illustrations of a concept described herein.
Figure 2:
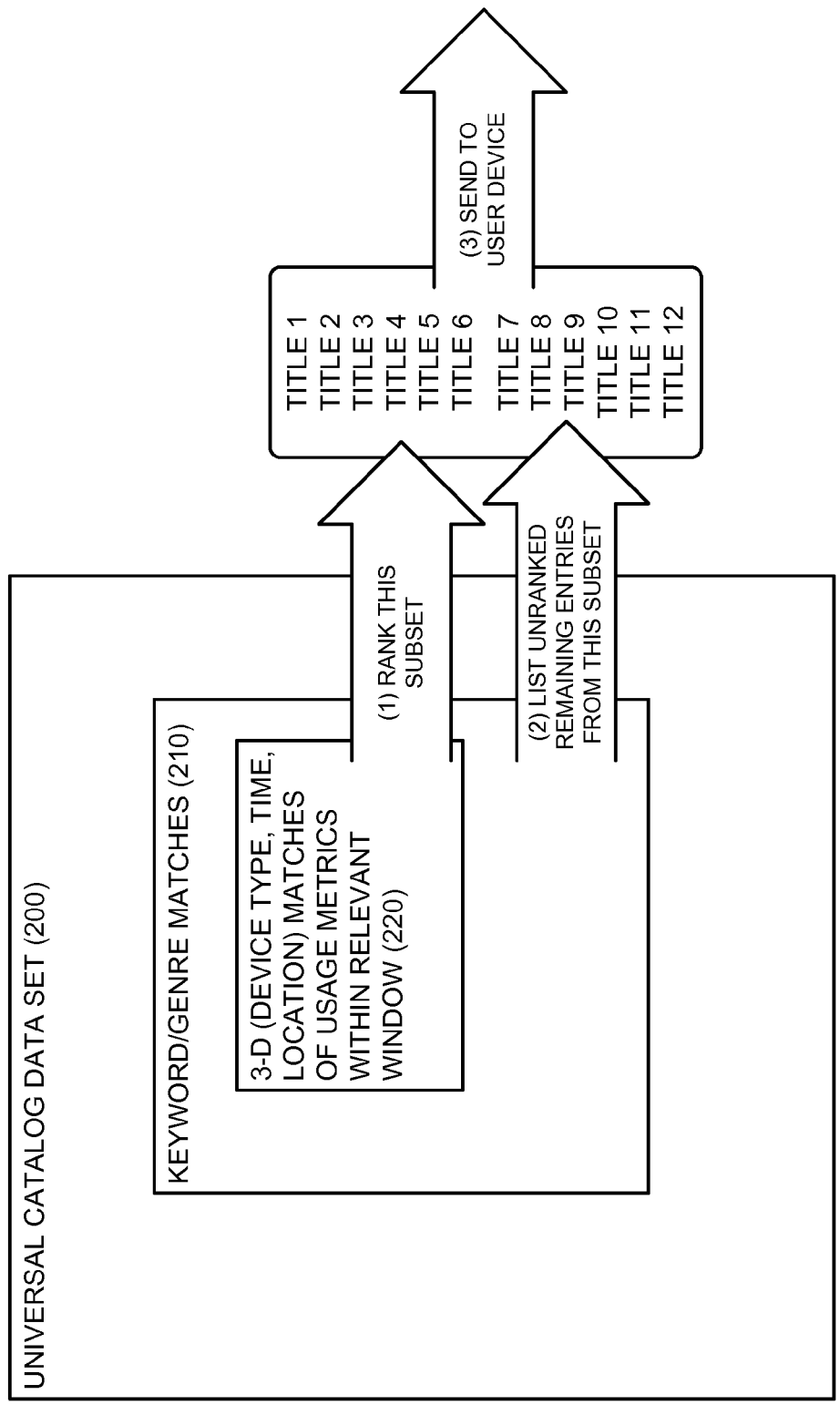

FIGS. 1 and 2 provide an illustration of concepts described herein. Referring to FIG. 1, customers, using user devices (e.g., tablet 110 and smart phone 120), may view a catalog of video content available from a server (e.g., server 100). Users of each user device may conduct a particular search (e.g., a keyword search) or browse a particular subset (e.g., a particular genre) of the catalog. Each user query (e.g., search or browse activity) may be categorized with three dimensions (e.g., a device type, a location, and a timeframe). The server (e.g., server 100) may provide results to each of the user devices (e.g., tablet 110 and smart phone 120) in sorted order by popularity value within the particular three dimensions. Thus, a user performing a search (e.g., browsing the "family" genre) on tablet device 110 on the weekend afternoon may be presented with one sorted order of relevant results from the catalog, as shown by catalog display 112. In contrast the same search operation performed by the same user on smart phone 120 during a week night may result in a different sorted order of search results, as shown by catalog display 122.

Referring to FIG. 2, when presented with a search term or browsing category from a user, a server (e.g., server 100) may select, from a universal catalog data set 200, matching catalog items 210 that are responsive to the particular search operation. The server may identify dimensions associated with the search (e.g., a device type, a location, and a timeframe) and may identify video assets 220, within matching catalog items 210, that have a previous order history in all three dimensions. The server may then rank, based on various popularity scores, the matching catalog items 220. The server may then append to the ranked items the remaining results, from the matching catalog items 210, that were responsive to the particular search operation, to generate a complete search result list for presentation on the customer's device.

As used herein, the terms "customer" and/or "user" may be used interchangeably. Furthermore, the terms "customer" and/or "user" are intended to be broadly interpreted to include a user device (e.g., a mobile communication device) or a user of a user device.

Figure 3:
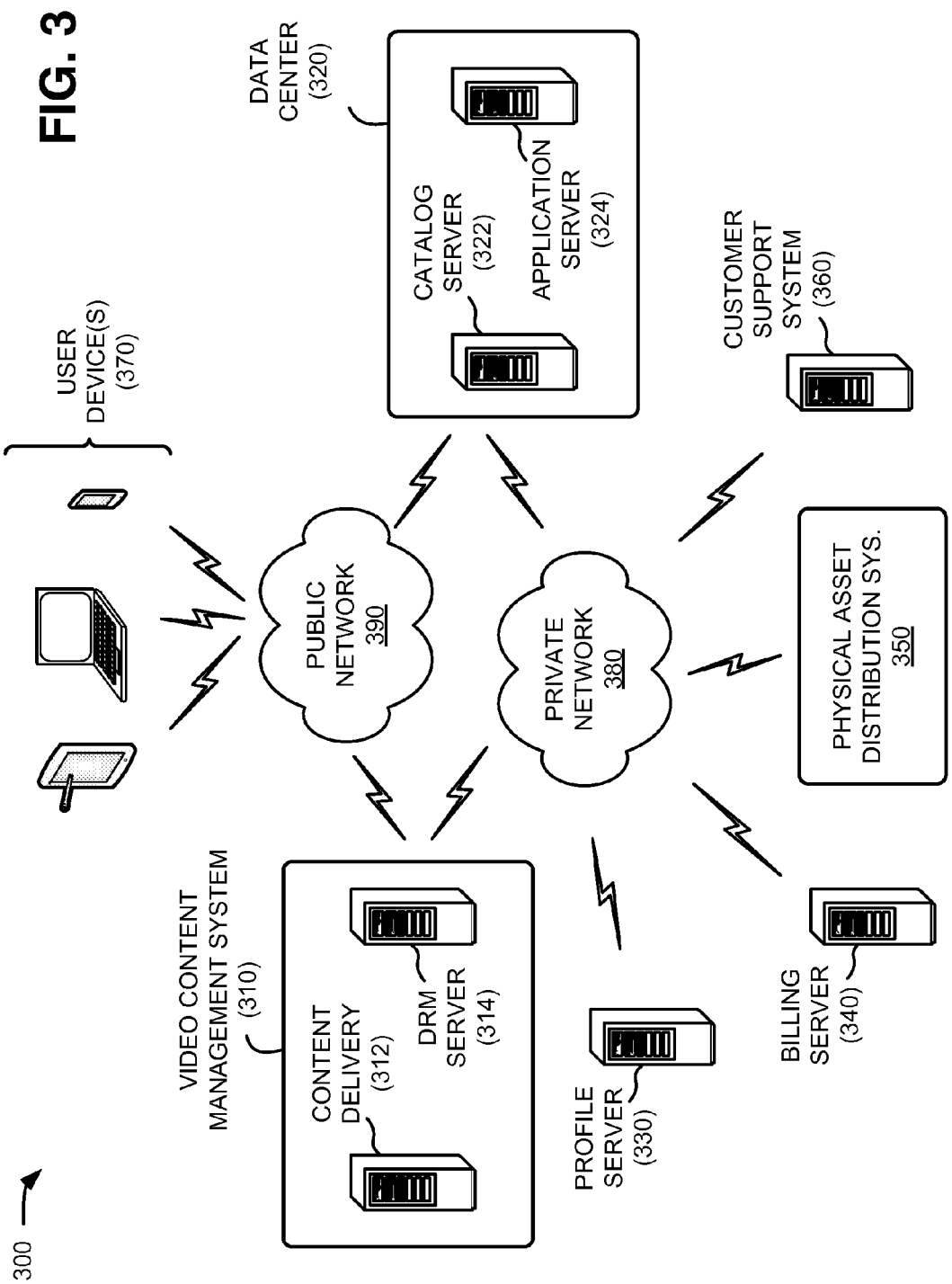
FIG. 3 is a diagram of an exemplary network in which systems and/or methods described herein may be implemented.

FIG. 3 is an exemplary network 300 in which systems and/or methods described herein may be implemented. Network 300 may generally represent a content distribution network. As illustrated, network 300 may include a video content management system (VCMS) 310, a data center 320, a profile server 330, a billing server 340, a physical asset distribution system 350, a customer support system 360, user devices 370, a private network 380, and a public network 390. The particular arrangement and number of components of network 300 shown in FIG. 3 are illustrated for simplicity. In practice there may be more VCMSs 310, data centers 320, profile servers 330, billing servers 324, physical asset distribution systems 350, customer support systems 360, user devices 370, and/or networks 380/390. Components of network 300 may be connected via wired and/or wireless links.

VCMS 310 may include one or more network devices, or other types of computation or communication devices, to aggregate content and content metadata, process content, and distribute content. In one implementation, VCMS 310 may include a content delivery system 312 and a digital rights management (DRM) server 314. VCMS 310 may aggregate content and transcode content into a digital format suitable for consumption on particular user devices 370. For example, VCMS 310 may include a transcoding device to convert a video file from one format to another (e.g., from one bit rate to another bit rate, from one resolution to another, from one standard to another, from one file size to another, etc). VCMS 310 may also encrypt data and communicate with DRM server 314 to enforce digital rights.

Content delivery system 312 may include one or more network devices, or other types of computation or communication devices, to deliver digital content from a backend server to user devices 370. In one implementation, content delivery system 312 may include a streaming server that provides streaming data packets (e.g., via a streaming URL) to user devices 370 (e.g., via network 380). In one implementation, a streaming URL may be session-based, such that each URL can be used only once for one user device 370 for security purposes.

DRM server 314 may include one or more network devices, or other types of computation or communication devices, to issue, validate, and/or enforce DRM licenses to a client, such as an application running on one of user devices 370. In implementations herein, DRM server 314 may communicate with user device 370 to authenticate a user of user device 370, the particular user device 370, and/or an application residing on user device 370. For example, DRM server 314 may request/receive login information associated with the user, and compare the login information with stored information to authenticate the user. Additionally, or alternatively, DRM server 314 may request/receive device information (e.g., a unique device identifier) associated with user device 370, and may compare the device information with stored information to authenticate user device 370.

Data center 320 may include one or more network devices, or other types of computation or communication devices, to manage the authorization, selection, and/or purchase of multimedia content by a user of user devices 370. As shown in FIG. 3, data center 320 may include a catalog server 322 and an application server 324. In one implementation, data center 320 may be accessed by user devices 370 via public network 390.

Catalog server 322 may include one or more network devices, or other types of computation or communication devices (e.g., a server device, an application server device, a Web server device, a database server device, a computer, etc.), to provide a unified catalog of both digital and physical content for users (e.g., of user devices 370) to consume (e.g., buy, rent, or subscribe). In one implementation, catalog server 322 may collect and/or present listings of video content available to user devices 370. For example, catalog server 322 may receive digital and/or physical content metadata, such as lists or categories of content, from VCMS 310 and/or physical asset distribution system 350. Catalog server 322 may use the content metadata to provide currently-available content options to user devices 370. Catalog server 322 may provide the content metadata to user device 370 directly or may communicate with user device 370 via application server 324.

Application server 324 may include one or more network devices, or other types of computation or communication devices (e.g., a server device, an application server device, a Web server device, a database server device, a computer, etc.), to provide a backend support system for mobile applications residing on user devices 370. For example, application server 324 may permit user device 370 to download a video application that may permit a user to find content of interest or play downloaded or streaming content. The video application may enable user device 370 to present to a user of user device 370 information received from data center 320 in an interactive format to allow selection of particular digital or physical content. Additionally, or alternatively, application server 324 may provide content metadata, such as lists or categories of content. Also, application server 324 may authenticate a user who desires to purchase, rent, or subscribe to digital or physical content. In one implementation, the interactions between application server 324 and user device 370 may be performed using hypertext transfer protocol (HTTP) or secure HTTP (HTTPS) via public network 390.

In one implementation, application server 324 may include a search index of content metadata (e.g., information regarding title, length, rating, director, performer, genre, etc.), and/or other data associated with content (e.g., file size, dates, popularity indicators, etc.). This data may be obtained from content delivery server 312, profile server 330, a "crawler" associated with VCMS 310, and/or another component. In another implementation, the search index may be included in catalog server 322 and access by application server 324. Application server 324 may receive search queries from user devices 370, may identify relevant results from the search index, and may provide ranked lists of video content in response thereto.

Profile server 330 may include one or more network devices, or other types of computation or communication devices, to store user profile information for users (e.g., users of user devices 370). The user profile information may include various information regarding a user, such as login information (e.g., a user identifier and a password), billing information, address information, types of services to which the user has subscribed, a list of digital/physical content purchased by the user, a list of video content rented by the user, a list of video content to which the user has subscribed, a user device identifier (e.g., a media player identifier, a mobile device identifier, a set top box identifier, a personal computer identifier) for user device 370, a video application identifier associated with the video application obtained from application server 324, or the like. Application server 324 may use the user profile information from profile server 330 to authenticate a user and may update the user profile information based on the user's activity (e.g., with a user's express permission).

Billing server 340 may include one or more network devices, or other types of computation or communication devices, to manage charging users for services provided via network 300. Billing server 340 may include, for example, a payment processing component, a billing component, and/or a settlement component.

Physical asset distribution system 350 may include one or more network devices, or other types of computation or communication devices, to track availability of physical content (e.g., DVDs, Blu-ray discs, memory cards, etc.) and provide metadata of physical content for inclusion in catalog information provided to users of user devices 370. In one implementation, physical asset distribution system 350 may also provide physical asset information, such as location information, so that when a user wants to buy a physical asset, the system can direct the user to the nearest geographic location (e.g., to retrieve the physical asset).

Customer support system 360 may include one or more network devices, or other types of computation or communication devices, to solicit and/or receive user feedback, questions, or credit-related requests. In one implementation customer support system 360 may include interfaces with data center 320 and/or billing server 340, for example, to receive problem reports and to resolve customer billing disputes.

User device 370 may include a computation or communication device to enable a user to view video content or interact with another user device 370 or a video display device (e.g., a set-top box and/or television). User device 370 may include, for example, a personal communications system (PCS) terminal (e.g., a smart phone that may combine a cellular radiotelephone with data processing and data communications capabilities), a tablet computer, a smart phone, a personal computer, a laptop computer, a gaming console, an Internet television, a digital video recorder (DVR) rental terminal, or other types of computation or communication devices. In one implementation, user device 370 may include a client-side application that enables user device 370 to communicate with, for example, data center 320 and/or present information received from data center 320 to a user. The client-side application may permit a user of user device 370 to log into an account (e.g., via application server 324), access catalog information (e.g., from catalog server 322), submit an order, and/or consume live streaming video content (e.g., from VCMS 310).

Private network 380 may include, for example, one or more private IP networks that use a private IP address space. Private network 380 may include a local area network (LAN), an intranet, a private wide area network (WAN), etc. In one implementation, private network 380 may implement one or more Virtual Private Networks (VPNs) for providing communication between, for example, any of VCMS 310, data center 320, profile server 330, billing server 340, physical asset distribution system 350, and/or customer support system 360. Private network 380 may be protected and/or separated from other networks, such as public network 390, by a firewall. Although shown as a single element in FIG. 3, private network 380 may include a number of separate networks.

Public network 390 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 3, public network 390 may include a number of separate networks that provide services to user devices 370.

Although FIG. 3 shows example components of network 300, in other implementations, network 300 may include fewer components, different components, differently arranged components, and/or additional components than those depicted in FIG. 3. Alternatively, or additionally, one or more components of network 300 may perform one or more tasks described as being performed by one or more other components of network 300. For example, in one implementation, the functions of catalog server 324, application server 324, or profile server 330 may be combined in a single device.

Figure 4:
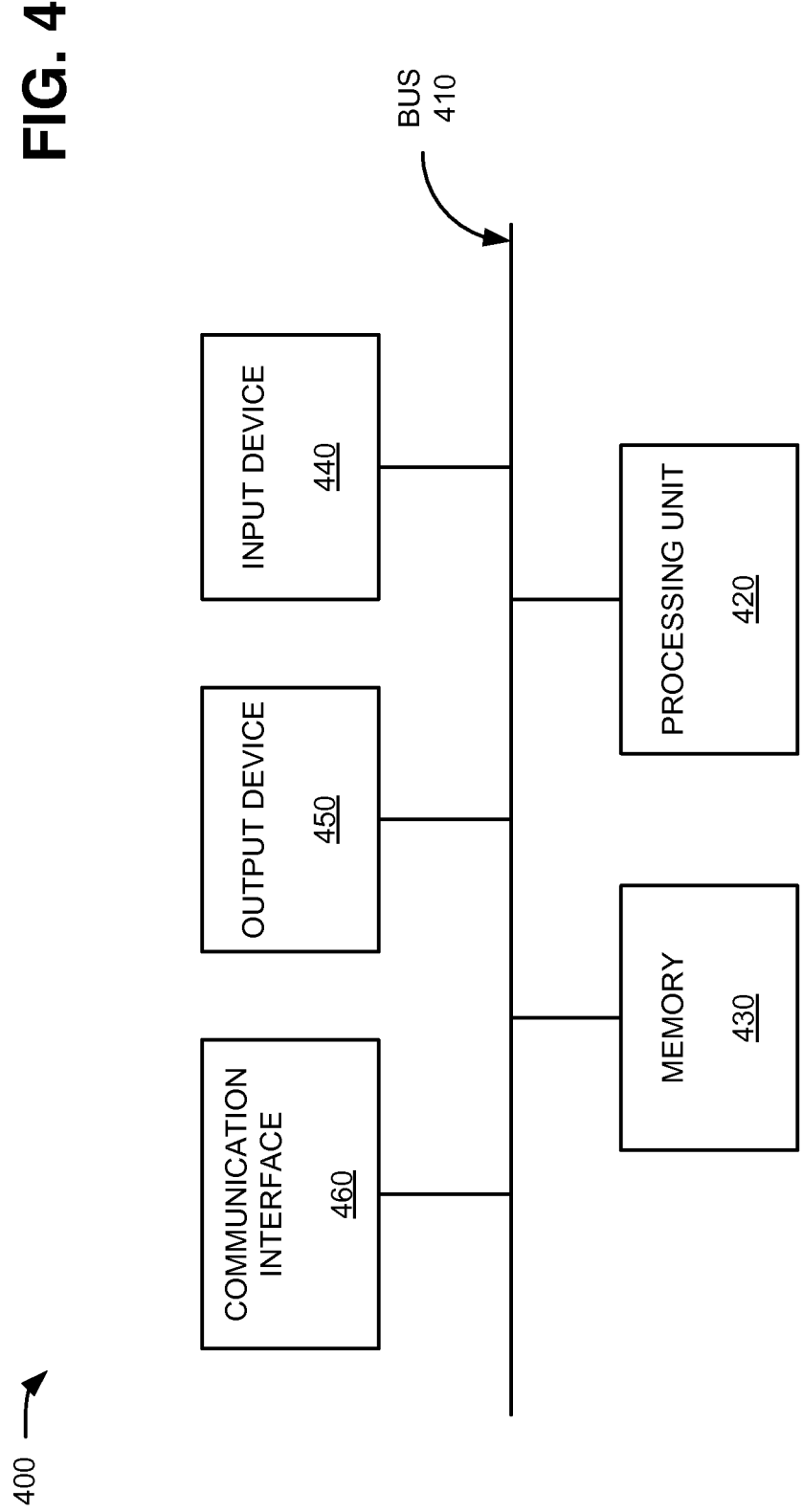
FIG. 4 is a diagram of exemplary components of one or more of the devices of the network depicted in FIG. 3.

FIG. 4 is a diagram of example components of a device 400 that may correspond to any one of the components of network 300. As illustrated, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include any transceiver-like mechanism that enables device 400 to communicate with other devices and/or systems. For example, communication interface 460 may include mechanisms for communicating with other devices, such as other components of network 300.

As described herein, device 400 may perform certain operations in response to processing unit 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently arranged components, or additional components than depicted in FIG. 4. As an example, in some implementations, input device 440 and/or output device 450 may not be implemented by device 400. In these situations, device 400 may be a "headless" device that does not explicitly include an input or an output device. Alternatively, or additionally, one or more components of device 400 may perform one or more other tasks described as being performed by one or more other components of device 400.

Figure 5:
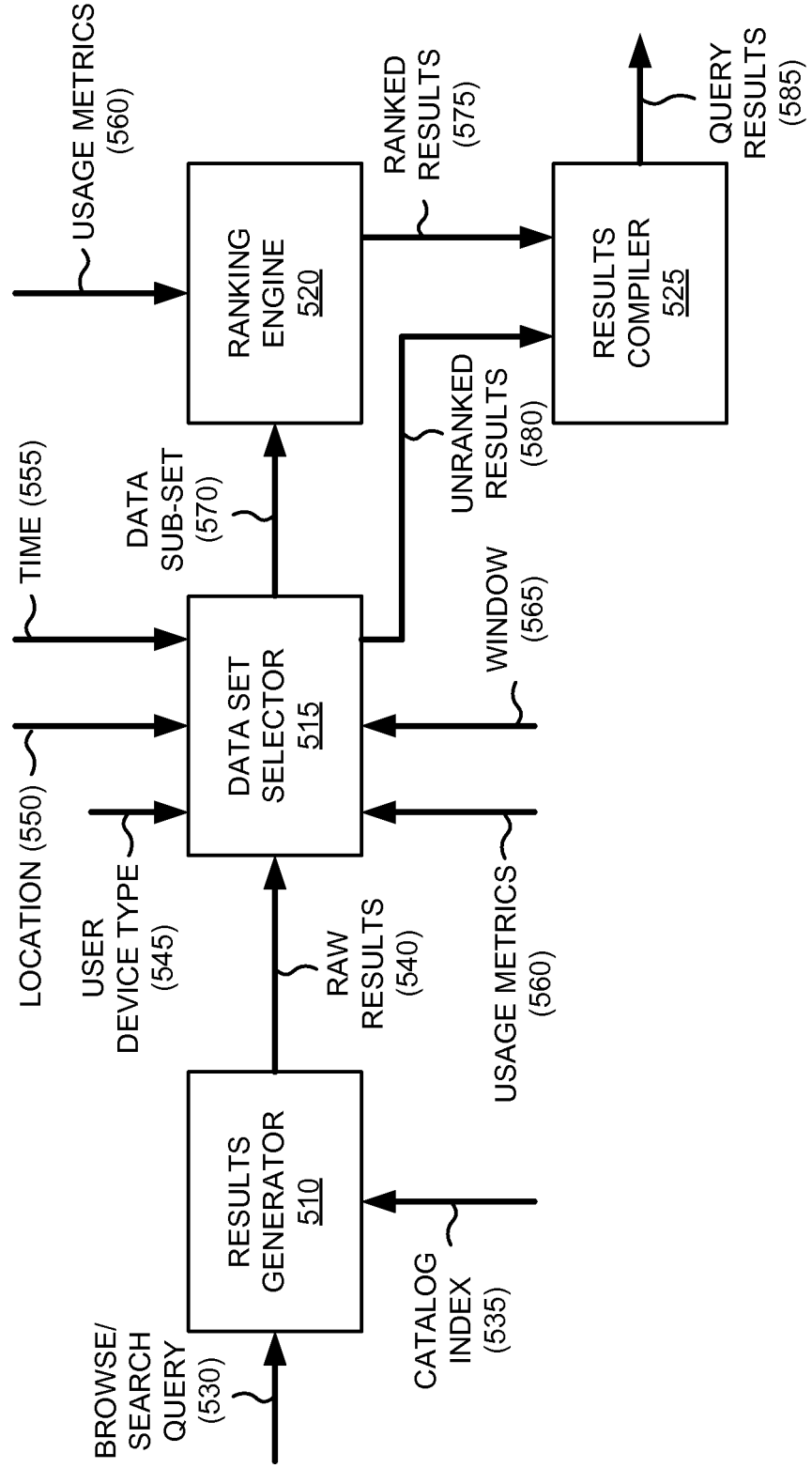
FIG. 5 is a diagram of communications among exemplary functional components of an application server of the network depicted in FIG. 2.

FIG. 5 is a diagram of example functional components of application server 324. In one implementation, the functions described in connection with FIG. 5 may be performed by one or more components of device 400 (FIG. 4). As shown in FIG. 5, application server 324 may include a results generator 510, a data set selector 515, a ranking engine 520, and a results compiler 525.

Results generator 510 may receive a search query and provide a list of results responsive the search query. For example, as shown in FIG. 5, results generator 510 may receive a browse/search query 530 from user device 370. In one implementation, browse/search query 530 may include one or more search terms (e.g., keywords) for video content available from VCMS 310. In another implementation, browse/search query 530 may include a category type, such as a genre, actors, directors, new releases, etc.

Figure 6:
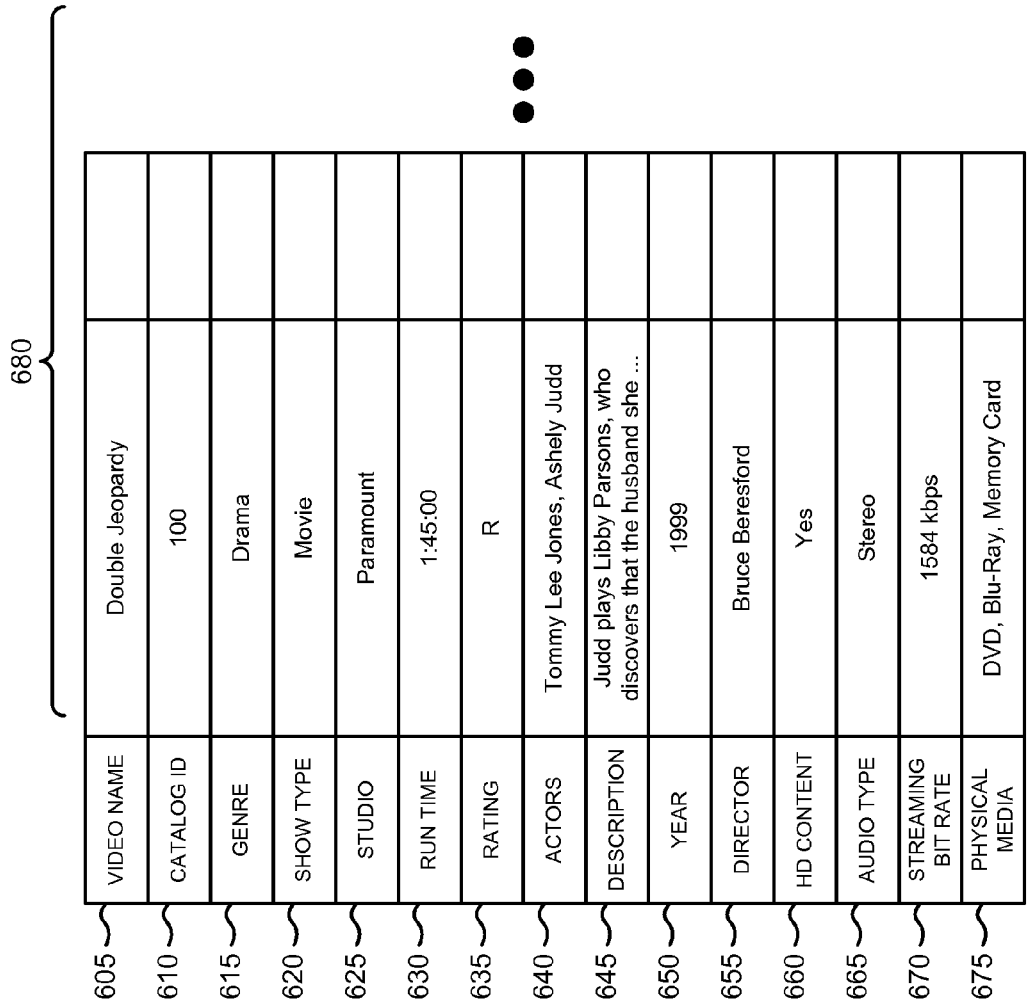
FIG. 6 is an example of a catalog table according to an implementation described herein.

In response to browse/search query 530, results generator 510 may retrieve/analyze a catalog index 535 to determine a list of relevant results. Catalog index 535 may be stored locally in application server 324 or retrieved from another device (e.g., catalog server 322) in network 300. FIG. 6 is an example of catalog index 535 according to an implementation described herein.

Catalog index 535 may include a video name field 605, a catalog identifier (ID) field 610, a genre field 615, a show type field 620, a studio field 625, a run time field 630, a rating field 635, an actors field 640, a description field 645, a year field 650, a director field 655, a high definition (HD) content field 660, an audio type field 665, a streaming bit rate field 670, a physical media field 675, and a variety of records or entries 680 associated with fields 605-675. Each column of catalog index 535 may correspond to a particular video item that may be available for selection by a user. Although records 680 for a single video item are shown in FIG. 6 for simplicity, catalog index 535 may include thousands of video items.

Video name field 605 may include a title (and sub-title) of a particular video item (e.g., "Double Jeopardy"). Catalog identifier field 610 may include a unique alpha-numeric indicator (e.g., "100") for the video item. Genre field 615 may include a genre classification for the video item, such as action, family, adventure, drama, comedy, etc. In one implementation, genre field 615 may include multiple genre classifications.

Show type field 620 may include a kind of video content associated with the video item, such as movie, TV show, sports, etc. Studio field 625 may include a name of a studio associated with producing the video item (e.g., "Paramount"). Run time field 630 may include a duration of the video item, such a particular number of hours/minutes/seconds (e.g., 1:45:00). Rating field 635 may include an institutional rating (such as an MPAA rating or TV Parental Guidelines rating) assigned to the video item, such as G, PG, PG-13, R, etc., for MPAA or TV-Y, TV-G, TV-MA, etc. for TV Parental Guidelines.

Actors field 640 may include names of primary actors associated with the video item (e.g., "Tommy Lee Jones, Ashley Judd"). In one implementation, actors field 640 may include multiple actors. Description field 645 may include a description of the video item content. For example, description field 645 may include character names and plot descriptions. Year field 650 may include a year associated with the video item, such as year of original release (e.g., 1999). Director field 655 may include names of directors associated with the video item (e.g., "Bruce Beresford"). In one implementation, director field 655 may include multiple directors.

High definition (HD) content field 660 may include an indication (e.g., yes or no) of whether HD video quality is available for the video item. Audio type field 665 may include an indication of an audio type (e.g., mono, stereo, etc.) for the video item. Streaming bit rate field 670 may include a streaming bit rate (e.g., "1584 kbps") required to support presenting the video item on a user device (e.g., user device 370). Physical media field 675 may include an indication of whether physical media (e.g., DVD, Blu-ray, memory card, none, etc.) of the video item is available for rent/purchase.

Although FIG. 6 shows exemplary fields for catalog index 535, in other implementations, catalog index 535 may include fewer fields, different fields, or additional fields than depicted in FIG. 6.

Returning to FIG. 5, when browse/search query 530 corresponds to a browse selection (e.g., to narrow selections to a particular category) results generator 510 may identify a field from catalog index 535 corresponding to the browse selection and identify results with the particular category indication. For example, if a user of user device 370 chooses to browse the video catalog by genre and selects "action" as the genre, results generator 510 may identify all video items in catalog index 535 with the term "action" in genre field 615. Conversely, when browse/search query 530 corresponds to a keyword search, results generator 510 may identify any video item where the keyword appears any one of entries 680. For example, if a user of user device 370 enters a keyword search for "squire," results generator 510 may identify all video items in catalog index 535 with the term "squire" in any of fields 605-675. Results generator 510 may pass an indication of the identified items as raw results 540 to data set selector 515.

Data set selector 515 may receive raw results 540 and may determine a subset of raw results 540 to rank based on three dimensions. In examples described herein, the three dimensions may include a user device type, a location, and a timeframe. In other implementations, different dimension may be used to define a subset of raw results 540. For example, age-based parental control settings (e.g., child, youth, teen, etc.) or account levels (e.g., basic, premium, etc.) associated with a user account may replace of one of the three dimensions above. As shown in FIG. 5, data selector 515 may retrieve (e.g., from profile server 330 and/or user device 370) a user device type 545, a location 550, and a time 555 associated with the user device 370 that submitted browse/search query 530.

User device type 545 may include a particular type, model, or operating systems of user device (e.g., Android-2, iPhone, mobile iOS, internet TV, DVR rental terminal, etc.). User device type 545 may be identified, for example, during a login process of user device 370 with profile server 330. User device type 545 may be indicated, for example, by a user device identifier associated with a user's profile or a model number provided by user device 370.

Location 550 may include a general location associated with user device 370. For example, location 550 may include a zip code, city, state, or geographical region. Location 550 may reflect a "home" region of a user or a current location of a user. For example, location 550 may be a location associated with a user's account determined. The account address may be based on a stored profile that is retrieved, for example, by profile server 530. As another example, location 550 may be a current geographic location that application server 324 retrieves from user device 370 with the permission of the user. Profile server 330 (or another device) may generalize the user's location information to reflect a particular zip code, city, state, or geographical region to be used by data set selector 515.

Time 555 may include a general timeframe associated with submission of browse/search query 530. Time 555 may include a timeframe such as a day of the week, a period of day (e.g., morning, afternoon, evening, late night, etc.), a type of day (e.g., weekday, weekend, holiday, etc.) that is based on the actual time of browse/search query 530. For example, if browse/search query 530 is submitted at 7:00 PM EST on a Tuesday, time 555 for browse/search query 530 may be a particular day of the week (e.g., Tuesday), a time of day (e.g., early evening), or a type of day (e.g., a weekday).

Usage metrics 560 may include profile information that corresponds to each asset in raw results 540. Usage metrics 560 may include, for example, the types of devices that have been used to view each title, locations associated with each viewing instance, and times (or time frames) associated with each viewing instance. Usage metrics 560 may be collected by profile server 330 or another device (not shown) of network 300 and updated in application server 324 at periodic intervals or in real time.

Window 565 may include a time period for relevant data. For example, window 565 may include a period of days, weeks, or months prior to receiving browse/search query 530. Window 565 may provide a cut-off for identifying usage metrics 560. For example, if window 565 is set at 60 days, data set selector may search for usage metrics within raw results 540 only back as far as 60 days from the time of browse/search query 530. Window 565 may be a pre-configured value stored in data set selector 515.

Based on the user device type 545, a location 550, and a time 555, data set selector 515 may extract a sub-set of raw results 540 and forward the subset to ranking engine 520 as data sub-set 570. For example, data set selector 515 may filter video titles in raw results 540 for usage metrics 560 within window 565 to determine which video titles from raw results 540 have usage metric with the same device type, the same location, and the same time as that of browse/search query 530. The filtered results (e.g., data sub-set 570) may be provided to ranking engine 520 for ordering.

In the event usage metrics 560 do not include sufficient data to match all three dimensions (e.g., device type 545, location 550, and time 555), data set selector 515 may reduce the number of dimension. For example, if data associated with time is not available or not statistically significant, data set selector 515 may conduct a two-dimension match based only on device type and location. Alternatively, if usage metrics 560 do not include sufficient data to match all three dimensions, data set selector 515 may substitute a similar dimension. For example, if data associated with a particular device type (e.g., an Android-2 device) is not available, then data set selector 515 may substitute a data from a similar device type (e.g., an iPhone-2 device).

Ranking engine 520 may rank keyword results from data sub-set 570 based on criteria specific to a video content distribution environment. For example, ranking engine 520 may receive data sub-set 570 and may apply one or more mechanisms to rank data sub-set 570 based on, for example, the number of digital sales of each asset, the number of physical sales of each asset, the number of browses of each asset, the number of user reviews of each asset, the user rating of each asset, any asset promotions for each asset, and/or other factors. Ranking engine 520 may retrieve usage metrics 560 (e.g., from profile server 330) and apply a set of ranking rules using usage metrics 560 and data sub-set 570 to determine scores of certain categories for each title in data sub-set 570. The category scores may then be weighted and totaled to generate a total score for each title. The scored titles of data sub-set 570 may then be ranked to generate a list of ranked results 575 that may be provided to results compiler 525.

Results compiler 525 may receive ranked results 575 from ranking engine 520 and a list of unranked results 580 from data set selector 515. Unranked results 580 may include titles from raw results 540 that were not included in data sub-set 570. In one implementation, unranked results may be sorted using a simple sort criteria (e.g., alphabetical by title) or ranked with different criteria than assets in data sub-set 570. Results compiler 525 may assemble ranked results 575 and unranked results 580 into a single file that may be provided to user device 370 (e.g., in response to search query 530).

Although FIG. 5 shows example functional components of application server 324, in other implementations, application server 324 may include fewer functional components, different functional components, differently arranged functional components, and/or additional functional components than depicted in FIG. 5. Alternatively, or additionally, one or more functional components of application server 324 may perform one or more tasks described as being performed by one or more other functional components of application server 324.

Figure 7:
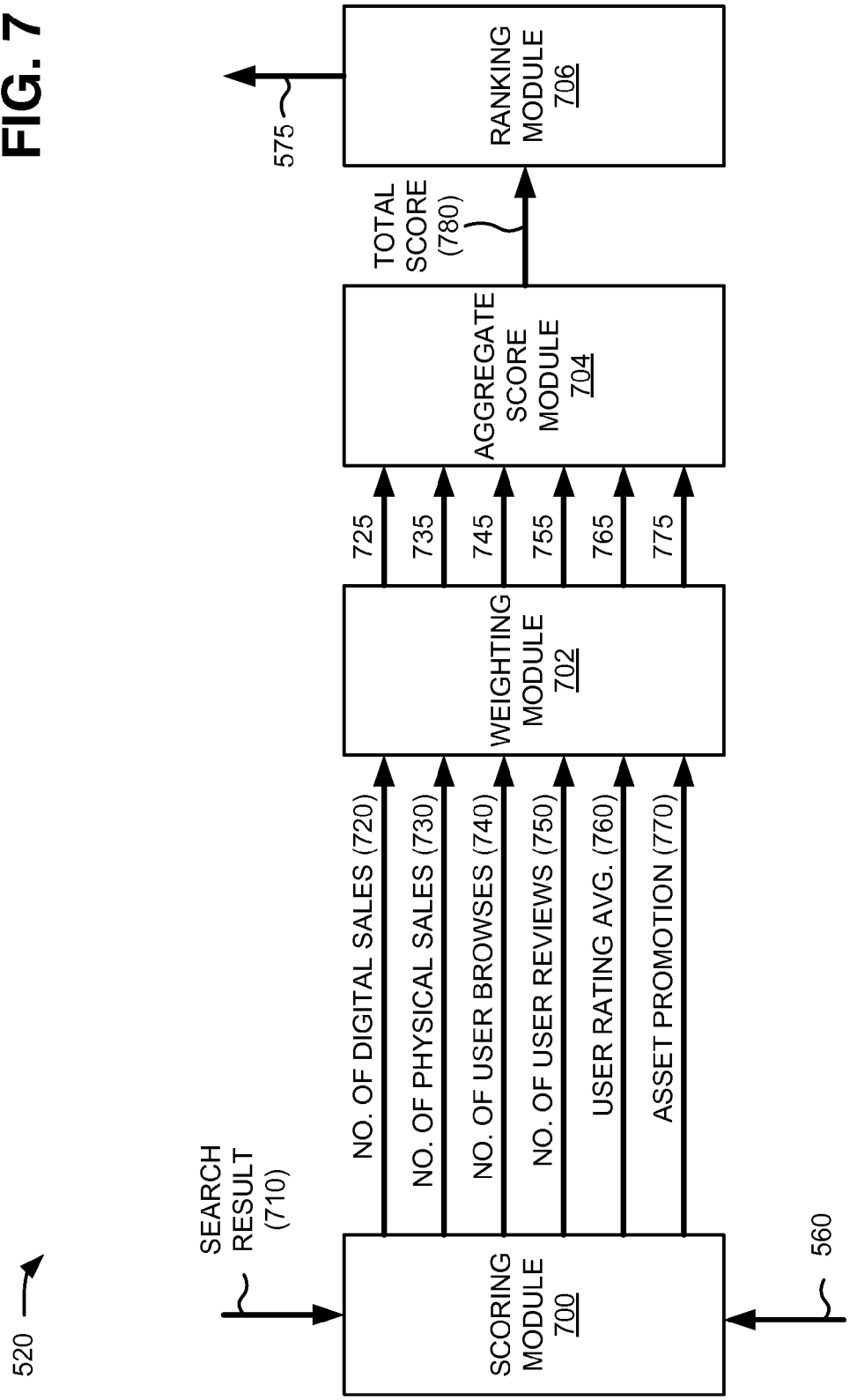
FIG. 7 is a diagram of exemplary functional components of a ranking engine depicted in FIG. 5.

FIG. 7 is a diagram of example functional components of ranking engine 520. In one implementation, the functions described in connection with FIG. 7 may be performed by one or more components of device 400 (FIG. 4). As shown in FIG. 7, ranking engine 520 may include a scoring module 700, a weighting module 702, an aggregate score module 704, and a ranking module 706. For each video asset listed in data sub-set 570, ranking engine 520 may determine a popularity value for the specific video asset in three dimensions (e.g., one device type in one location at a particular time).

Scoring module 700 may include hardware or a combination of hardware and software to generate sub-scores, for each search result, in particular categories. For example, scoring module 700 may receive a search result 710, which may correspond to a particular video asset from data sub-set 570 (FIG. 5). Search result 710 may include a descriptor for a video content item. Scoring module 700 may receive usage metrics 560 to assign sub-scores for search result 710 based on usage metrics 560. Sub-scores that may be assigned by scoring module 700 may include a number of digital sales 720, a number of physical sales 730, a number of user browses 740, a number of user reviews 750, a user rating average 760, and an asset promotion score 770.

Number of digital sales 720 may include a number of sales of a digital version of a video asset (corresponding to search result 710) transacted by particular user device type 545 in particular location 550 at particular time 555. A digital version of an asset may include, for example, streaming video and/or a file download. Number of physical sales 730, similarly, may include a number of sales of a physical version of a video asset (corresponding to the same video title) transacted by the particular user device type 545 in the particular location 550 at the particular time 555. A physical version of an asset may include, for example, a DVD, Blu-ray disc, or memory card.

Number of user browses 740 may include a number of detailed-view selections of the particular asset from a catalog. For example, number of user browses may count instances when users select a detailed view of a catalog asset on a particular user device type 545 in the particular location 550 at the particular time 555. Number of user reviews 750 may include a number of reviews of the particular video provided by users using the particular user device type 545 in the particular location 550 at the particular time 555. User rating average 760 may include the average rating (e.g., between 1 and 5 stars, corresponding to how much user liked the video) for the particular video. Asset promotion score 770 may include a number of promotions that cover the particular video and may be scored as an integer value (e.g., 1, 2, etc.)

Scoring module 700 may calculate sub-scores (e.g., number of digital sales 720, number of physical sales 730, number of user browses 740, number of user reviews 750, user rating average 760, and asset promotion score 770) for each search result 710, and provide each sub-score to weighting module 702.

Weighting module 702 may include hardware or a combination of hardware and software to apply a weight (e.g., significance) value to each sub-score received from scoring module 700. For example, weighting module 702 may apply a different weight value to one or more of number of digital sales 720, number of physical sales 730, number of user browses 740, number of user reviews 750, user rating average 760, and asset promotion score 770 to generate a weighted digital sales score 725, a weighted physical sales 735, a weighted user browses 745, a weighted user reviews 755, a weighted user rating average 765, and a weighted asset promotion score 775.

Weight values (e.g., applied by weighting module 702) for each sub-score may be configured to give ranking preference to particular sub-scores that may be more relevant in the context of a video asset search and to account for disparities in raw sub-score values. For example, scores involving actual sales, such as number of digital sales 720 or number of physical sales 730, may be weighted more heavily than scores of other user input (e.g., number of user browses 740, number of user reviews 750, or user rating average 760). Additionally, scores with a low integer value, such as asset promotion score 770, may have a high measurement weight to contrast a high raw number of other scores (e.g., number of user browses 740, number of user reviews 750). Weighting module 702 may provide weighted digital sales score 725, weighted physical sales 735, weighted user browses 745, weighted user reviews 755, weighted user rating average 765, and weighted asset promotion score 775 to aggregate score module 704.

Aggregate score module 704 may include hardware or a combination of hardware and software to combine the weighed sub-scores received from weighting module 702 into a total (e.g., aggregate) score 780 for search result 710. Total score 780 may be provided to ranking module 706.

Ranking module 706 may include hardware or a combination of hardware and software to receive total score 780 for each search result 710 (e.g., for all asset s of data sub-set 570 generated by data set selector 515 of FIG. 5). Ranking module 706 may rank each search result 710, among the other keyword results 710, based on total score 780 assigned to each search result 710. When total scores 780 for all keyword results 710 have been received, ranking module 706 may generate ranked results 575 that may be provided to results compiler 525.

Although FIG. 7 shows example functional components of ranking engine 520, in other implementations, ranking engine 520 may include fewer functional components, different functional components, differently arranged functional components, and/or additional functional components than depicted in FIG. 7. Furthermore, fewer sub-scores, different sub-scores, differently arranged sub-scores, and/or additional sub-scores than depicted in FIG. 7 may be used. Alternatively, or additionally, one or more functional components of ranking engine 520 may perform one or more tasks described as being performed by one or more other functional components of ranking engine 520.

Figure 8:
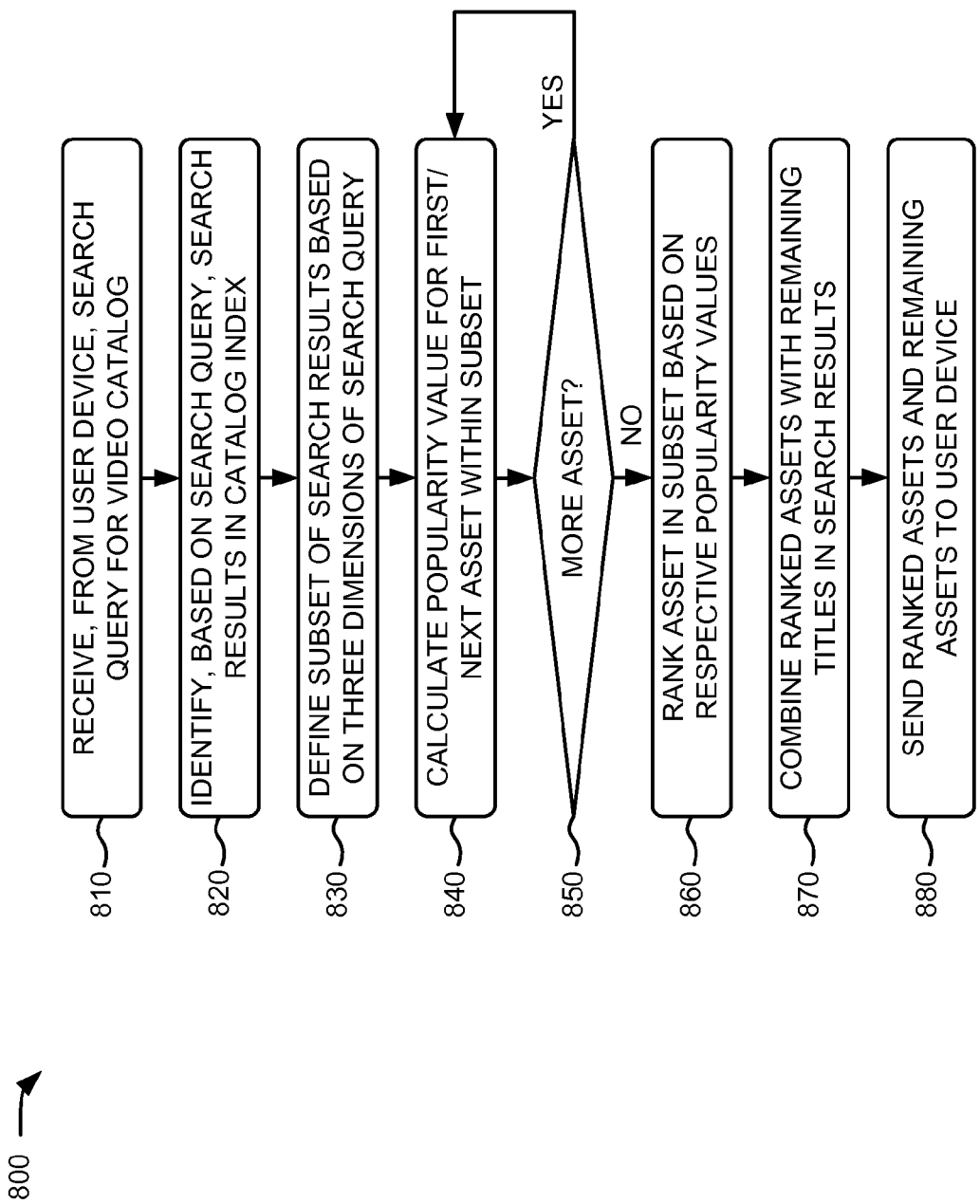

FIGS. 8 and 9 are flow charts of an example process 800 for providing dynamic catalog ranking according to an implementation described herein. In one implementation, process 800 may be performed by application server 324. In another implementation, some or all of process 800 may be performed by another device or group of devices, including or excluding application server 324.

As illustrated in FIG. 8, process 800 may include receiving, from a user device 370, a search query for a video catalog (block 810), and identifying, based on the search query, relevant search results in a catalog index (block 820). For example, in implementations described above in connection with FIG. 5, application server 324 (e.g., results generator 510) may receive a browse/search query 530 from user device 370. In one implementation, browse/search query 530 may include one or more search terms (e.g., keywords) for video content available from VCMS 310. In another implementation, browse/search query 530 may include a category type, such as a genre, actors, directors, new releases, etc. In response to browse/search query 530, results generator 510 may retrieve/analyze catalog index 535 to determine a list of relevant results. Results generator 510 may pass an indication of the identified items to data set selector 515 as raw results 540.

As further shown in FIG. 8, process 800 may include defining a subset of the search results based on three dimensions of the user query (block 830). For example, in implementations described above in connection with FIG. 5, application server 324 (e.g., data set selector 515) may receive raw results 540 and may determine a subset of raw results 540 to rank based on three dimensions, such as a user device type, a location, and a time. The subset of raw results may be forwarded to ranking engine 520 as data sub-set 570.

Process 800 may also include calculating a popularity value for a first asset within the defined subset (block 840) and determining if there are more assets within the defined subset to process (block 850). If there are more assets to process (block 850—YES), process 800 may return process block 840 to calculate a popularity value for a next asset within the defined subset. If there are no more relevant results to process (block 850—NO), process 800 may include ranking the assets in the defined subset based on the respective popularity values (block 860). For example, in implementations described above in connection with FIG. 5, application server 324 (e.g., ranking engine 520) may receive data sub-set 570 and may apply one or more mechanisms to rank data sub-set 570. Ranking engine 520 may retrieve usage metrics 560 (e.g., from profile server 330) and apply a set of ranking rules using usage metrics 560 and data sub-set 570 to determine scores of certain categories for each asset in data sub-set 570. The category scores may then be weighted and totaled to generate a total score for each asset. A total score for each asset may be calculated. The scored assets of data sub-set 570 may then be ranked to generate a list of ranked results 575 that may be provided to results compiler 525.

Process 800 may further include combining the ranked assets with the remaining assets from the search results (block 870), and sending the combined ranked assets and remaining assets to user device 370 (block 880). For example in implementations described above in connection with FIG. 5, application server 324 (e.g., results compiler 525) may receive ranked results 575 from ranking engine 520 and unranked results 580 that were not included in data sub-set 570. Results compiler 525 may assemble ranked results 575 and unranked results 580 into a single file that may be provided to user device 370 (e.g., in response to search query 530).

Process block 830 may include the process blocks depicted in FIG. 9. As shown in FIG. 9 process block 830 may include identifying a type of user device that generated the search query (block 910), identifying a location associated with user device that generated the search query (block 920), and identifying a time period associated with the search query (block 930). For example, as described above in connection with FIG. 5, data selector 515 may retrieve (e.g., from profile server 330 or user device 370) or determine a user device type 545, a location 550, and a time 555 associated with the user device 370 that submitted browse/search query 530. User device type 545 may include a particular type, model, or operating systems of user device as indicated, for example, by a user device identifier. Location 550 may include a general location associated with user device 370, such as a zip code, city, state, or geographical region indicated in a user's account profile. Time 555 may include a general timeframe (e.g., evening, weekday, etc.) corresponding to the actual submission time of browse/search query 530.

Process block 830 may also include retrieving usage metrics of video assets in the search results for a particular window (block 940), and filtering the search results for the video assets with usage metrics having the same user device type, location, and timeframe (block 950). For example, as described above in connection with FIG. 5, data set selector 515 may retrieve usage metrics 560 (e.g., from profile server 330 or another source within network 300). Data set selector 515 may filter video assets in raw results 540 to determine which video assets from raw results 540 have usage metrics (e.g., usage metrics 560 within window 565) with the same device type, the same location, and the same timeframe as that of browse/search query 530. The filtered results (e.g., data sub-set 570) may be provided to ranking engine 520 for ordering.

Systems and/or methods described herein may generate responses to search queries that include recommendations of popular video assets. Recommendations are selected from relevant search results and identified by filtering based on multiple dimensions (e.g., device type, location, and time) of the search query. Using the systems and/or methods described herein, an application server may produce a sorted order of video listings by popularity value for the customer residing in those dimensions to view on the user device screen with a better user experience.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. Further, while series of acts have been described with respect to FIGS. 8 and 9, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, from a user device, a search query for video content listings in a video catalog;
   identifying, based on the search query, a set of relevant video assets from an index of the catalog content;
   extracting, from the set of relevant video assets, a subset of the relevant video assets, wherein the subset is determined based on filtering usage metrics, for each video asset in the set of relevant video assets, against three different aspects of the search query;
   calculating a popularity value for each video asset in the subset of the relevant video assets;
   ranking, based on the respective popularity values, each video asset in the subset of the relevant video assets to form a ranked list;
   appending, to the ranked list, a remainder of the video assets from the set of relevant video assets; and
   sending, to the user device, a response to the search query that includes the ranked list and the remainder of the video assets from the set of relevant video assets.

2. The method of claim 1, wherein the three different aspects of the search query include:
   a type of the user device,
   a location associated with the user device, and
   a submission timeframe of the search query.

3. The method of claim 1, wherein calculating the popularity value for each video asset comprises:
   assigning a first sub-score to one of the video assets based on a number of streaming video or downloaded file sales, and
   assigning a second sub-score to the one of the video assets based on a number of physical format sales.

4. The method of claim 3, wherein calculating the popularity value for each video asset further comprises one or more of:
   assigning a sub-score to the one of the video assets based on a number of user browses of the one of the video assets in the video catalog,
   assigning a sub-score to the one of the video assets based on a number of user reviews of the one of the video assets in the video catalog,
   assigning a sub-score to the one of the video assets based on an average user rating of the one of the video assets in the video catalog, and
   assigning a sub-score to the one of the video assets based on a number of asset promotions for the one of the video assets in the video catalog.

5. The method of claim 3, wherein calculating the popularity value for each video asset further comprises:
   applying a weight to each of the sub-scores to create a weighted sub-score for each of the sub-scores, and
   calculating a total score, for the one of the video assets, based on the weighted sub-scores.

6. The method of claim 1, wherein the index of catalog content includes, for each video asset:
   a video name field,
   a genre field,
   an actors field,
   a description field,
   a streaming bit rate field, and
   a physical media field.

7. The method of claim 1, wherein the search query includes:
   a keyword search, or
   a browsing category selection.

8. A device, comprising:
   a memory configured to store a plurality of instructions; and
   a processor configured to execute instructions in the memory to:
      receive, from a user device, a search query for video content listings in a video catalog;
      identify, based on the search query, a set of relevant video assets from an index of the catalog content;
      determine a plurality of dimensional values of the search query;
      extract, from the set of relevant video assets, a subset of the relevant video assets, wherein the subset is determined based on filtering usage metrics against the plurality of dimensional values, and wherein the usage metrics include metrics for each video asset in the set of relevant video assets and for a particular time window,
      calculate a popularity value for each video asset in the subset of the relevant video assets;

rank, based on the respective popularity values, each video asset in the subset of the relevant video assets to form a ranked list;

append to the ranked list, remaining video assets from the set of relevant video assets; and send, to the user device, a response to the search query that includes the ranked list and the remaining video assets from the set of relevant video assets.

9. The device of claim 8, wherein the plurality of dimensional values of the search query include:

an indicator for a type of the user device, a location associated with the user device, and a submission timeframe of the search query.

10. The device of claim 9, where the user device is one of:

personal communications system (PCS) terminal, a tablet computer, a smart phone, a personal computer, a laptop computer, a gaming console, an Internet television, or a digital video recorder (DVR) rental terminal.

11. The device of claim 8, wherein, when calculating the popularity value for each video asset, the processor is further configured to:

assign a sub-score to one of the video assets based on a number of user browses of the one of the video assets in the video catalog, assign a sub-score to the one of the video assets based on a number of user reviews of the one of the video assets in the video catalog, assign a sub-score to the one of the video assets based on an average user rating of the one of the video assets in the video catalog, or assign a sub-score to the one of the video assets based on a number of asset promotions for the one of the video assets in the video catalog.

12. The device of claim 11, wherein, when calculating the popularity value for each video asset, the processor is further configured to:

assign a sub-score to the one of the video assets based on a number of digital format sales, and assign a sub-score to the one of the video assets based on a number of physical format sales.

13. The device of claim 11, wherein, when calculating the popularity value for each video asset, the processor is further configured to:

apply a weight to each of the sub-scores to create a weighted sub-score for each of the sub-scores, calculate a total score, for the one of the video assets, based on the weighted sub-scores.

14. The device of claim 8, wherein the device is an application server within a content distribution network.

15. A non-transitory computer-readable medium, including instructions executable by at least one processor, the computer-readable medium comprising one or more instructions for:

receiving, from a user device, a search query for video content listings in a video catalog;

identifying, based on the search query, a set of relevant video assets from an index of the catalog content;

determining a set of dimensional values of the search query, wherein the set of dimensional values includes an indicator for a type of the user device, a location associated with the user device, and a timeframe of the search query;

extracting, from the set of relevant video assets, a subset of the relevant video assets, wherein the subset is determined based on filtering usage metrics, for each video asset in the set of relevant video assets, against the dimensional values;

ranking each video asset in the subset of the relevant video assets to form a ranked list;

appending, to the ranked list, a remainder of the video assets from the set of relevant video assets; and sending, to the user device, a response to the search query that includes the ranked list, and the remainder of the video assets from the set of relevant video assets.

16. The non-transitory computer-readable medium of claim 15, wherein the timeframe of the search query includes a period inclusive of an actual time of receiving the search query.

17. The non-transitory computer-readable medium of claim 15, wherein the location includes a geographic area associated with a profile of a user of the user device.

18. The non-transitory computer-readable medium of claim 15, wherein the indicator for the type of the user device includes a user device model number.

\* \* \* \* \*